United States Patent
Yasui et al.

(10) Patent No.: US 10,732,642 B2
(45) Date of Patent: Aug. 4, 2020

(54) TRAVEL CONTROL APPARATUS, TRAVEL CONTROL METHOD, AND STORAGE MEDIUM

(71) Applicant: HONDA MOTOR CO., LTD., Minato-ku, Tokyo (JP)

(72) Inventors: Yuji Yasui, Wako (JP); Hideki Matsunaga, Wako (JP)

(73) Assignee: HONDA MOTOR CO., LTD., Tokyo (JP)

(*) Notice: Subject to any disclaimer, the term of this patent is extended or adjusted under 35 U.S.C. 154(b) by 75 days.

(21) Appl. No.: 15/990,996

(22) Filed: May 29, 2018

(65) Prior Publication Data

US 2018/0348786 A1  Dec. 6, 2018

(30) Foreign Application Priority Data

Jun. 2, 2017  (JP) .................... 2017-110197

(51) Int. Cl.
*G05D 1/02* (2020.01)
*B60W 30/14* (2006.01)
(Continued)

(52) U.S. Cl.
CPC ........... *G05D 1/0253* (2013.01); *B60W 10/20* (2013.01); *B60W 30/143* (2013.01);
(Continued)

(58) Field of Classification Search
CPC .................................................. G05D 1/0253
See application file for complete search history.

(56) References Cited

U.S. PATENT DOCUMENTS 7,702,442 B2 * 4/2010 Takenaka ........... B60G 17/0195
  701/48
8,024,091 B2 * 9/2011 Takenaka ............. B60T 8/1755
  180/197
(Continued)

FOREIGN PATENT DOCUMENTS

JP  2007-216877  8/2007
JP  2017-081382  5/2017
(Continued)

OTHER PUBLICATIONS

Japanese Office Action for Japanese Patent Application No. 2017-110197 dated Mar. 26, 2019.

*Primary Examiner* — Alex C Dunn
(74) *Attorney, Agent, or Firm* — Amin, Turocy & Watson, LLP

(57) ABSTRACT

A travel control apparatus (140) includes a acquisition unit (141), which acquires information on a target track through which a vehicle (M) will pass in the future, a parameter determiner (142), which determines a parameter by which a track model defined by one or more parameters coincides with a track acquired by the acquisition unit, and a steering controller (143), which feedforward-controls steering of the vehicle on the basis of at least the track model defined by the parameter determined by the parameter determiner, wherein the parameter determiner determines the parameter on the basis of a direction of a change in the degree of separation between the track model and the target track with respect to a change in the parameter.

10 Claims, 9 Drawing Sheets

(51) Int. Cl.
*B60W 30/16* (2020.01)
*G08G 1/16* (2006.01)
*B60W 10/20* (2006.01)
*B62D 15/02* (2006.01)
*B60W 50/00* (2006.01)

(52) U.S. Cl.
CPC ........... *B60W 30/16* (2013.01); *B62D 15/025* (2013.01); *B62D 15/0255* (2013.01); *B62D 15/0265* (2013.01); *G05D 1/0248* (2013.01); *G08G 1/166* (2013.01); *B60W 2050/0034* (2013.01); *G08G 1/167* (2013.01)

(56) References Cited

U.S. PATENT DOCUMENTS

| | | | | |
|---|---|---|---|---|
| 8,401,737 | B2 * | 3/2013 | Aso | B60W 10/12 180/446 |
| 8,543,261 | B2 * | 9/2013 | Anderson | B60W 30/09 701/3 |
| 8,831,833 | B2 * | 9/2014 | Hayashi | B60G 17/015 701/42 |
| 9,550,526 | B2 * | 1/2017 | You | B62D 15/025 |
| 10,222,806 | B2 * | 3/2019 | Nakada | B62D 15/025 |
| 2008/0091318 | A1 * | 4/2008 | Deng | B62D 6/003 701/41 |
| 2012/0101680 | A1 * | 4/2012 | Trepagnier | G01S 17/023 701/26 |
| 2014/0253722 | A1 * | 9/2014 | Smyth | G01P 3/38 348/135 |
| 2016/0202670 | A1 * | 7/2016 | Ansari | G05B 13/026 700/45 |
| 2017/0153611 | A1 | 6/2017 | Fujii et al. | |
| 2018/0050697 | A1 * | 2/2018 | Kuszmaul | G01S 19/14 |
| 2018/0284785 | A1 * | 10/2018 | Berntorp | G05D 1/0214 |

FOREIGN PATENT DOCUMENTS

| | | |
|---|---|---|
| JP | 2017-102619 | 6/2017 |
| WO | 2017/033752 | 3/2017 |

* cited by examiner

| CURVATURE | 0.000 | 0.005 | 0.010 | 0.013 | 0.020 | 0.033 | 0.050 | 0.100 | 0.200 | 0.250 |
|---|---|---|---|---|---|---|---|---|---|---|
| CURVATURE RADIUS | Infinity | 200 | 100 | 75 | 50 | 30 | 20 | 10 | 5 | 4 |
| X COORDINATE $x\_i$ | | | | | | | | | | |
| 0 | 0 | 0 | 0 | 0 | 0 | 0 | 0 | 0 | 0 | 0 |
| 0.5 | 0 | 0.000625 | 0.00125 | 0.001667 | 0.0025 | 0.004167 | 0.006251 | 0.012508 | 0.025063 | 0.031373 |
| 1 | 0 | 0.0025 | 0.005 | 0.006667 | 0.010001 | 0.016671 | 0.025016 | 0.050126 | 0.101021 | 0.127017 |
| 1.5 | 0 | 0.005625 | 0.011251 | 0.015002 | 0.022505 | 0.037523 | 0.056329 | 0.11314 | 0.230304 | 0.291901 |
| 2 | 0 | 0.01 | 0.020002 | 0.026671 | 0.040016 | 0.066741 | 0.100251 | 0.202041 | 0.417424 | 0.535898 |
| 3 | 0 | 0.022501 | 0.04501 | 0.060024 | 0.090081 | 0.150377 | 0.22628 | 0.460608 | 1 | 1.354249 |
| 4 | 0 | 0.040004 | 0.080032 | 0.106743 | 0.160257 | 0.267863 | 0.404082 | 0.834849 | 2 | 4 |
| 5 | 0 | 0.06251 | 0.125078 | 0.166852 | 0.250628 | 0.419601 | 0.635083 | 1.339746 | 5 | 5.5 |
| 7 | 0 | 0.122538 | 0.245301 | 0.327381 | 0.492425 | 0.828096 | 1.265006 | 2.858572 | 5.5 | 6 |
| 10 | 0 | 0.250156 | 0.501256 | 0.669656 | 1.010205 | 1.715729 | 2.679492 | 10 | 10.5 | 11 |
| 15 | 0 | 0.563293 | 1.1314 | 1.515308 | 2.30304 | 4.019238 | 6.771243 | 10.5 | 11 | 12 |
| 20 | 0 | 1.002513 | 2.02041 | 2.715839 | 4.174243 | 7.63932 | 20 | 20.5 | 21 | 21.5 |
| 25 | 0 | 1.568652 | 3.175416 | 4.289322 | 6.69873 | 13.41688 | 20.5 | 21 | 21.5 | 22 |
| 35 | 0 | 3.086313 | 6.32503 | 8.667504 | 14.29286 | 30 | 30.5 | 31 | 31.5 | 32 |
| 40 | 0 | 4.040821 | 8.348486 | 11.55711 | 20 | 30.5 | 31 | 31.5 | 32 | 32.5 |
| 45 | 0 | 5.128247 | 10.69714 | 15 | 20.20551 | 31 | 31.5 | 32 | 32.5 | 33 |
| 50 | 0 | 6.350833 | 13.39746 | 19.0983 | 50 | 50.5 | 51 | 51.5 | 52.5 | 53.5 |

$y\_i$

A1

TRAVEL CONTROL APPARATUS, TRAVEL CONTROL METHOD, AND STORAGE MEDIUM

CROSS-REFERENCE TO RELATED APPLICATION

Priority is claimed on Japanese Patent Application No. 2017-110197, filed Jun. 2, 2017, the content of which is incorporated herein by reference.

BACKGROUND OF THE INVENTION

Field of the Invention

The present invention relates to a travel control apparatus, a travel control method, and a storage medium.

Description of Related Art

Research into automated driving, in which a vehicle autonomously travels without requiring an operation by a driver, has been conducted (for example, see Japanese Unexamined Patent Application, First Publication No. 2017-81382). In the automated driving, control is considered to determine a track along which the vehicle will travel in the future and adjust a steering angle according to the track in the case of a curve.

SUMMARY OF THE INVENTION

However, there is a case where when the steering angle is adjusted according to a control cycle of a control computer, a change in the steering angle is not able to follow the curve and thus the track of the vehicle is expanded. In order to avoid this, when high frequency control is performed, the steering angle is changed little by little, resulting in the occurrence of unnecessary vibration.

In contrast, a method for setting in advance a target steering angle for each curve is also considered. However, in this method, since it is necessary to inspect all curves along which an automated driving vehicle may travel, it is not realistic.

An aspect of the present invention has been made to solve the above problem and an object of the present invention to provide a travel control apparatus, a travel control method, and a storage medium, by which it is possible to allow a vehicle to smoothly travel along a curve.

A travel control apparatus, a travel control method, and a storage medium according to the invention employ the following configurations.

(1) A travel control apparatus according to an aspect of the invention is a travel control apparatus (140) including an acquisition unit (141), which acquires information on a target track through which a vehicle (M) will pass in the future, a parameter determiner (142), which determines a parameter by which a track model defined by one or more parameters coincides with a track acquired by the acquisition unit, and a steering controller (143), which feedforward-controls steering of the vehicle on the basis of at least the track model defined by the parameter determined by the parameter determiner, wherein the parameter determiner determines the parameter on the basis of a direction of a change in the degree of separation between the track model and the target track with respect to a change in the parameter.

(2) In the aspect of the aforementioned (1), the track model is a curve model obtained by modeling a track including a curve.

(3) In the aspect of the aforementioned (1), the track model is a model including an arc and the parameter is a curvature or a curvature radius of the arc.

(4) In the aspect of the aforementioned (3), the track model is formed such that displacement in a proceeding direction is monotonically increased from a front at which a sum of turning angles exceeds 90°.

(5) In the aspect of the aforementioned (1), the parameter determiner adds a reference signal to an input value of a function for evaluating the degree of separation between the track model and the target track, extracts a variation component of an output value of the function, performs a filter process by multiplying the extracted variation component by the reference signal, derives a correlation value that becomes zero when the degree of separation between the track model and the target track is minimum, and searches for the parameter for making the correlation value zero.

(6) In the aspect of the aforementioned (5), the parameter determiner performs an integration feedback process, thereby searching for the parameter for making the correlation value zero.

(7) In the aspect of the aforementioned (5), the filter process includes a movement average filter process of an integer times a period of the reference signal.

(8) In the aspect of the aforementioned (1), the steering controller calculates a feedback steering angle for reducing a lateral deviation for a target position by a method based on sliding mode control, and controls steering of the vehicle on the basis of both a feedforward steering angle based on the track model and the feedback steering angle.

(9) A travel control method according to an aspect of the invention is a travel control method causing a computer to perform acquiring information on a target track through which a vehicle is to pass in the future, deciding a parameter by which a track model defined by one or more parameters coincides with a track acquired by the acquisition unit, and feedforward-controlling steering of the vehicle on the basis of at least the track model defined by the determined parameter, wherein, in deciding the parameter, the parameter is determined on the basis of a direction of a change in a degree of separation between the track model and the target track with respect to a change in the parameter.

(10) A storage medium according to an aspect of the invention includes a non-transitory computer-readable storage medium stored with a program causing a computer to perform acquiring information on a target track through which a vehicle is to pass in the future, deciding a parameter by which a track model defined by one or more parameters coincides with a track acquired by the acquisition unit, and feedforward-controlling steering of the vehicle on the basis of at least the track model defined by the determined parameter, wherein, in deciding the parameter, the parameter is determined on the basis of a direction of a change in a degree of separation between the track model and the target track with respect to a change in the parameter.

According to the aspects of (1) to (10), it is possible to allow a vehicle to travel smoothly along a curve.

According to the aspect of (4), it is possible to stably control a sharp curve with a large curvature.

BRIEF DESCRIPTION OF THE DRAWINGS

FIG. 7 is a diagram illustrating an example of content of a track model regulating table.

DETAILED DESCRIPTION OF THE INVENTION

Hereinafter, an embodiment of a travel control apparatus, a travel control method, and a storage medium of the present invention will be described with reference to the drawings.

[Overall Configuration]

Figure 1:
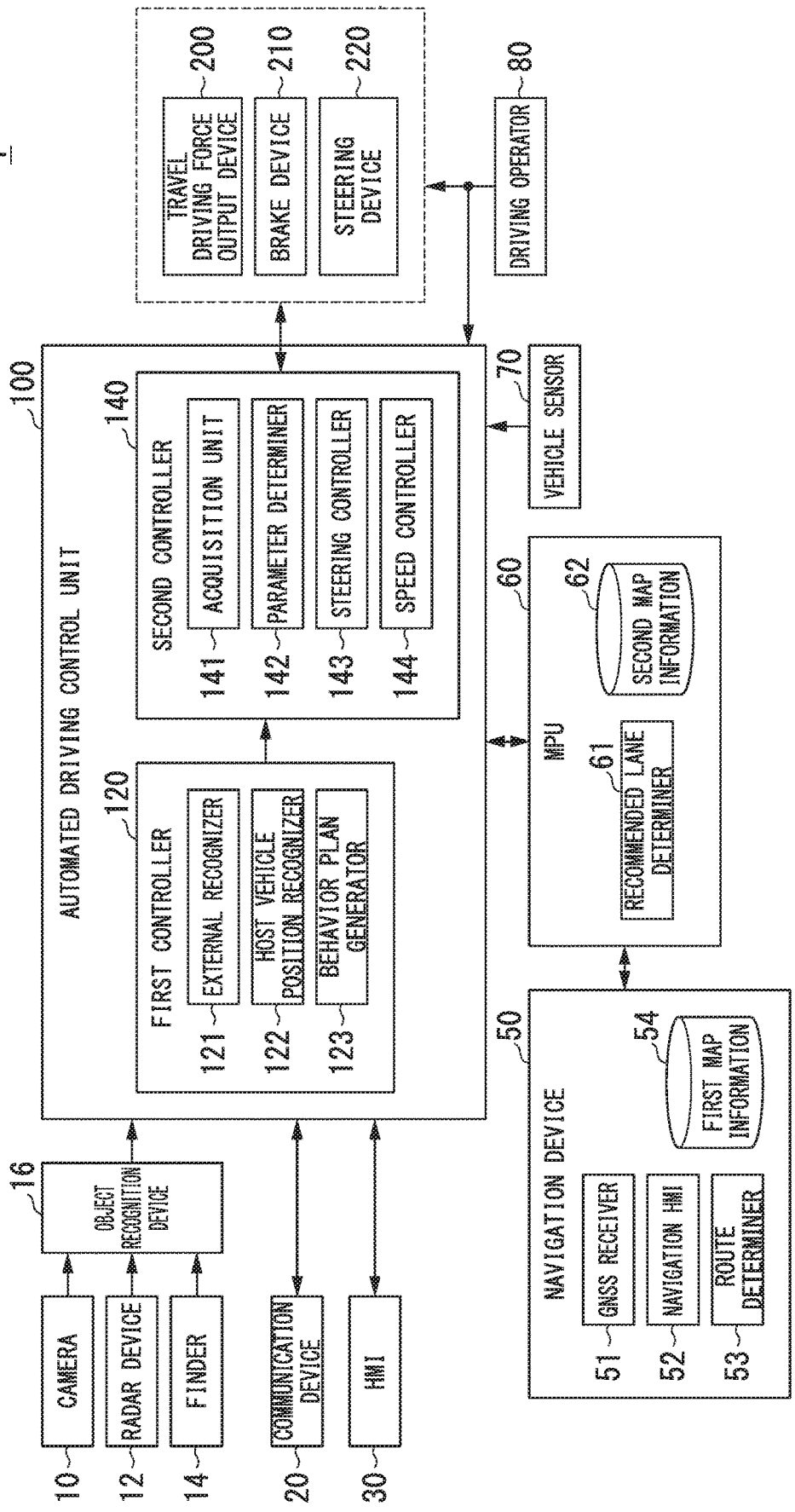
FIG. 1 is a configuration diagram of a vehicle system using a travel control apparatus according to an embodiment.

FIG. 1 is a configuration diagram of a vehicle system 1 using a travel control apparatus according to an embodiment. A vehicle, in which the vehicle system 1 is installed, for example, is a vehicle with two wheels, three wheels, four wheels and the like, and its driving source is an internal combustion engine such as a diesel engine and a gasoline engine, an electric motor, or a combination thereof. The electric motor operates by using power generated by a generator connected to the internal combustion engine or power discharged from a secondary cell or a fuel cell.

The vehicle system 1, for example, includes a camera 10, a radar device 12, a finder 14, an object recognition device 16, a communication device 20, a human machine interface (HMI) 30, a navigation device 50, a map positioning unit (MPU) 60, a vehicle sensor 70, a driving operator 80, an automated driving control unit 100, a travel driving force output device 200, a brake device 210, and a steering device 220. These devices and equipments are connected to one another via a multiplex communication line such as a controller area network (CAN) communication line, a serial communication line, a wireless communication network and the like. The configuration illustrated in FIG. 1 is merely an example, and parts of the configuration may be omitted, or other configurations may be added.

The camera 10, for example, is a digital camera using a solid-state imaging element such as a charge coupled device (CCD) and a complementary metal oxide semiconductor (CMOS). One or a plurality of cameras 10 are mounted at arbitrary places of the vehicle (hereinafter, referred to as a host vehicle M) in which the vehicle system 1 is installed. In the case of capturing an image of an area in front of the host vehicle M, the camera 10 is mounted at an upper part of a front windshield, on a rear surface of a rear-view mirror, and the like. The camera 10, for example, periodically and repeatedly captures an image of an area in the vicinity of the host vehicle M. The camera 10 may be a stereo camera.

The radar device 12 emits radio waves such as millimeter waves to the vicinity of the host vehicle M, detects radio waves (reflected waves) reflected by an object, and detects at least a position (a distance and an orientation) of the object. One or a plurality of radar devices 12 are mounted at arbitrary places of the host vehicle M. The radar device 12 may detect the position and the speed of the object by a frequency modulated continuous wave (FM-CW) scheme.

The finder 14 is a light detection and ranging or laser imaging detection and ranging (LIDAR) that measures scattered light for irradiation light and detects a distance to a target. One or a plurality of finder 14 are mounted at arbitrary places of the host vehicle M.

The object recognition device 16 performs a sensor fusion process for detection results by some or all of the camera 10, the radar device 12, and the finder 14, thereby recognizing the position, the type, the speed and the like of the object. The object recognition device 16 outputs a recognition result to the automated driving control unit 100. The object recognition device 16 may output the detection results of the camera 10, the radar device 12, and the finder 14 to the automated driving control unit 100 as is according to necessity.

The communication device 20, for example, communicates with other vehicles in the vicinity of the host vehicle M by using a cellular network, a Wi-Fi network, Blue tooth (a registered trademark), dedicated short range communication (DSRC) and the like, or communicates with various server devices via a radio base station.

The HMI 30 presents various types of information to a drive of the host vehicle M and receives an input operation by the driver. The HMI 30 includes various display devices, a speaker, a buzzer, a touch panel, a switch, a key and the like.

The navigation device 50, for example, includes a global navigation satellite system (GNSS) receiver 51, a navigation HMI 52, and a route determiner 53, and holds first map information 54 in a storage device such as a hard disk drive (HDD) and a flash memory. The GNSS receiver 51 specifies a position of the host vehicle M on the basis of signals received from a GNSS satellite. The position of the host vehicle M may be specified or complemented by an inertial navigation system (INS) using output of the vehicle sensor 70. The navigation HMI 52 includes a display device, a speaker, a touch panel, a key and the like. A part of all of the navigation HMI 52 may be shared with the aforementioned HMI 30. The route determiner 53, for example, determines a route (hereinafter, a map route) to a destination, which is input by the driver by using the navigation HMI 52, from the position (or an input arbitrary position) of the host vehicle M specified by the GNSS receiver 51 with reference to the first map information 54. The first map information 54, for example, is information in which a road shape is expressed by links indicating a road and nodes connected to one another by the links. The first map information 54 may include a curvature of a road, point of interest (POI) information and the like. The map route determined by the route determiner 53 is output to the MPU 60. On the basis of the map route determined by the route determiner 53, the navigation device 50 may perform route guidance using the navigation HMI 52. The navigation device 50, for example, may be implemented by functions of a terminal device such as a smart phone and a tablet terminal owned by a user. The navigation device 50 may transmit a current position and a destination to a navigation server via the communication device 20, or acquire a map route as a reply from the navigation server.

The MPU 60, for example, serves as a recommended lane determiner 61 and holds second map information 62 in a storage device such as an HDD and a flash memory. The recommended lane determiner 61 divides a route provided from the navigation device 50 into a plurality of blocks (for example, divides the route in units of 100 [m] in a vehicle proceeding direction) and determines recommended lanes for each block with reference to the second map information 62. The recommended lane determiner 61 determines in which lane from the left to travel. When a branch point, a merging point and the like are on the route, the recommended lane determiner 61 determines a recommended lane such that the host vehicle M can travel a reasonable route for traveling to a branch destination.

The second map information 62 is more precise map information than the first map information 54. The second map information 62, for example, includes information on the center of a lane, information on the boundary of a lane, and the like. The second map information 62 may include road information, traffic regulation information, address information (addresses and postal codes), facility information, telephone number information and the like. The second map information 62 may be frequently updated through access to another device by means of the communication device 20.

The vehicle sensor 70 includes a vehicle speed sensor that detects a vehicle speed of the host vehicle M, an acceleration sensor that detects an acceleration, a yaw rate sensor that detects an angular velocity around a vertical axis, a direction sensor that detects a direction of the host vehicle M, and the like.

The driving operator 80, for example, includes an accelerator pedal, a brake pedal, a shift lever, a steering wheel, and other operators. A sensor is mounted on the driving operator 80 to detect an operation amount or the presence or absence of an operation, and the detection results are output to one or both of the automated driving control unit 100, the travel driving force output device 200, the brake device 210, and the steering device 220.

The automated driving control unit 100, for example, includes a first controller 120 and a second controller 140. The second controller 140 is an example of a "travel control device". The first controller 120 and the second controller 140 are implemented when a processor such as a central processing unit (CPU) executes a program (software). Some or all of functional parts of the first controller 120 and the second controller 140 to be described below may be implemented by hardware such as a large scale integration (LSI), an application specific integrated circuit (ASIC), and a field-programmable gate array (FPGA), or may be implemented by the software and the hardware in cooperation.

The first controller 120, for example, includes an external recognizer 121, a host vehicle position recognizer 122, and a behavior plan generator 123.

The external recognizer 121 recognizes states (positions, speeds, accelerations and the like) of objects in the vicinity of the host vehicle M on the basis of information input from the camera 10, the radar device 12, and the finder 14 via the object recognition device 16. The position of the object may be represented by a representative point of a centroid, a corner and the like of the object, or may be represented by an expressed area. The "state" of the object may include an acceleration, a jerk, or a "behavior state" (for example, whether lane change is performed or is intended to be performed) of the object. On the basis of an image captured by the camera 10, the external recognizer 121 recognizes a shape of a curve through which the host vehicle M will pass next. The external recognizer 121 converts the shape of the curve into a real plane from the image captured by the camera 10, and for example, outputs information, which is expressed using two-dimensional point sequence information or a model equivalent to this, to the behavior plan generator 123 as information indicating the shape of the curve.

The host vehicle position recognizer 122, for example, recognizes a lane (a travel lane) on which the host vehicle M is traveling, and a relative position and an orientation of the host vehicle M with respect to the travel lane. The host vehicle position recognizer 122, for example, compares a pattern (for example, an arrangement of solid lines and broken lines) of a road section line obtained from the second map information 62 with a pattern of a road section line in the vicinity of the host vehicle M, which is recognized from the image captured by the camera 10, thereby recognizing the travel lane. In the recognition, the position of the host vehicle M and the processing results of the INS, which are obtained from the navigation device 50, may be provided.

Figure 2:
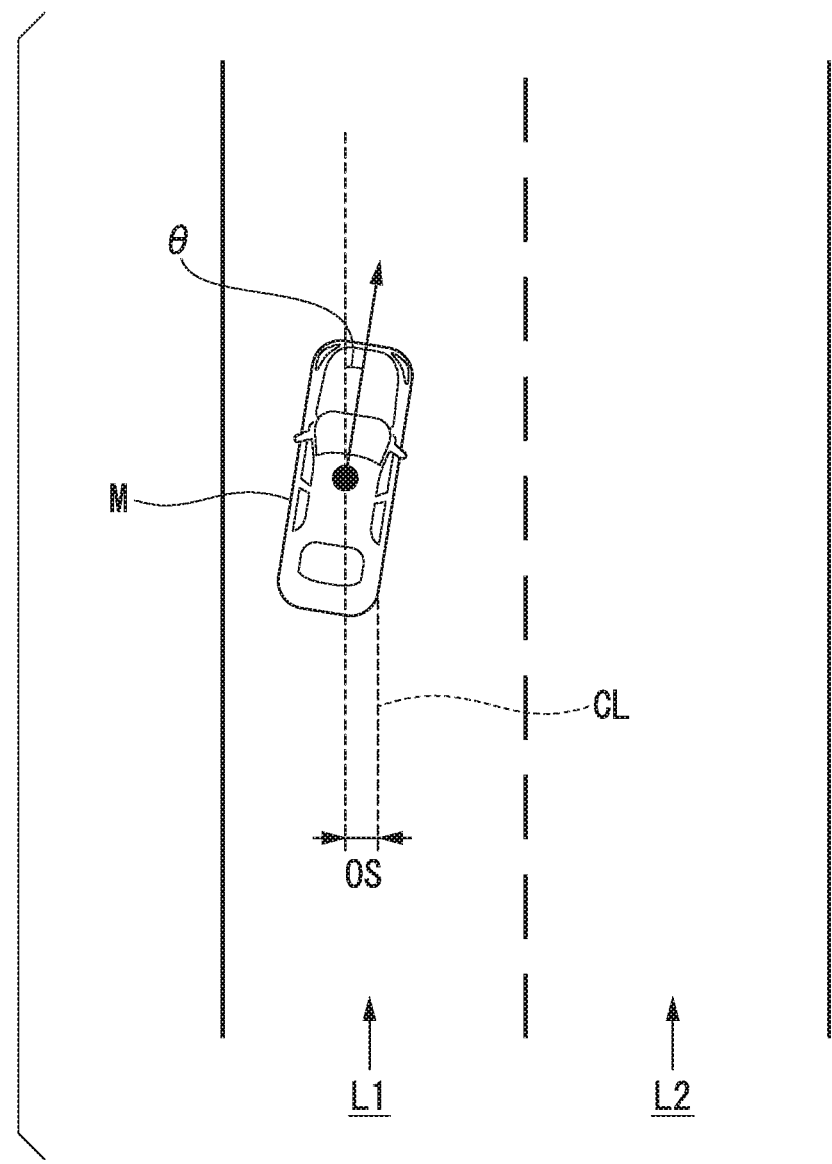
FIG. 2 is a diagram illustrating a mode in which a relative position and an orientation of a host vehicle for a travel lane are recognized by a host vehicle position recognizer.

The host vehicle position recognizer 122, for example, recognizes the position and the orientation of the host vehicle M with respect to the travel lane. FIG. 2 is a diagram illustrating a mode in which a relative position and an orientation of the host vehicle M for a travel lane L1 are recognized by the host vehicle position recognizer 122. The host vehicle position recognizer 122, for example, recognizes, as the relative position and the orientation of the host vehicle M for the travel lane L1, separation OS from a travel lane center CL of a reference point (for example, a centroid) of the host vehicle M, and an angle θ formed between a line connecting the travel lane center CL and the proceeding direction of the host vehicle M. Instead of this, the host vehicle position recognizer 122 may recognize the position and the like of the reference point of the host vehicle M with respect to any side end portion of the host lane L1 as the relative position of the host vehicle M with respect to the travel lane. The relative position of the host vehicle M recognized by the host vehicle position recognizer 122 is provided to the recommended lane determiner 61 and the behavior plan generator 123.

The behavior plan generator 123 determines events to be sequentially performed in automated driving to travel on the recommended lane determined by the recommended lane determiner 61 and to cope with surrounding situations of the host vehicle M. The events, for example, include a constant speed travel event of traveling on the same travel lane at a constant speed, a following travel event of following a front traveling vehicle, an overtaking event of overtaking a front traveling vehicle, an avoidance event of avoiding an obstacle, a curve travel event of traveling along a curve, a lane change event, a merging event, a branch event, a stop event, a takeover event for switching the automated driving to manual driving, and the like. During the execution of these events, there are cases where a behavior for avoidance is planned on the basis of the surrounding situations (the presence of surrounding vehicles and pedestrians, lane narrowness due to road construction, and the like) of the host vehicle M.

The behavior plan generator 123 generates a target track along which the host vehicle M will travel in the future. Details of each function part will be described later. The target track, for example, includes speed elements. For example, the target track is expressed by sequentially arranging points (track points) at which the host vehicle M should arrive. The track points are points at which the host vehicle M should arrive every predetermined travel distance (for example, about several [m]) at a distance along a road, and separately from this, a target speed and a target acceleration every predetermined sampling time (for example, about several tenths of a [sec]) are generated as a part of the target track. The track points may be positions at which the host vehicle M should arrive at each predetermined sampling time every predetermined sampling time. In this case, information on the target speed and the target acceleration is expressed at intervals of the track points.

Figure 3:
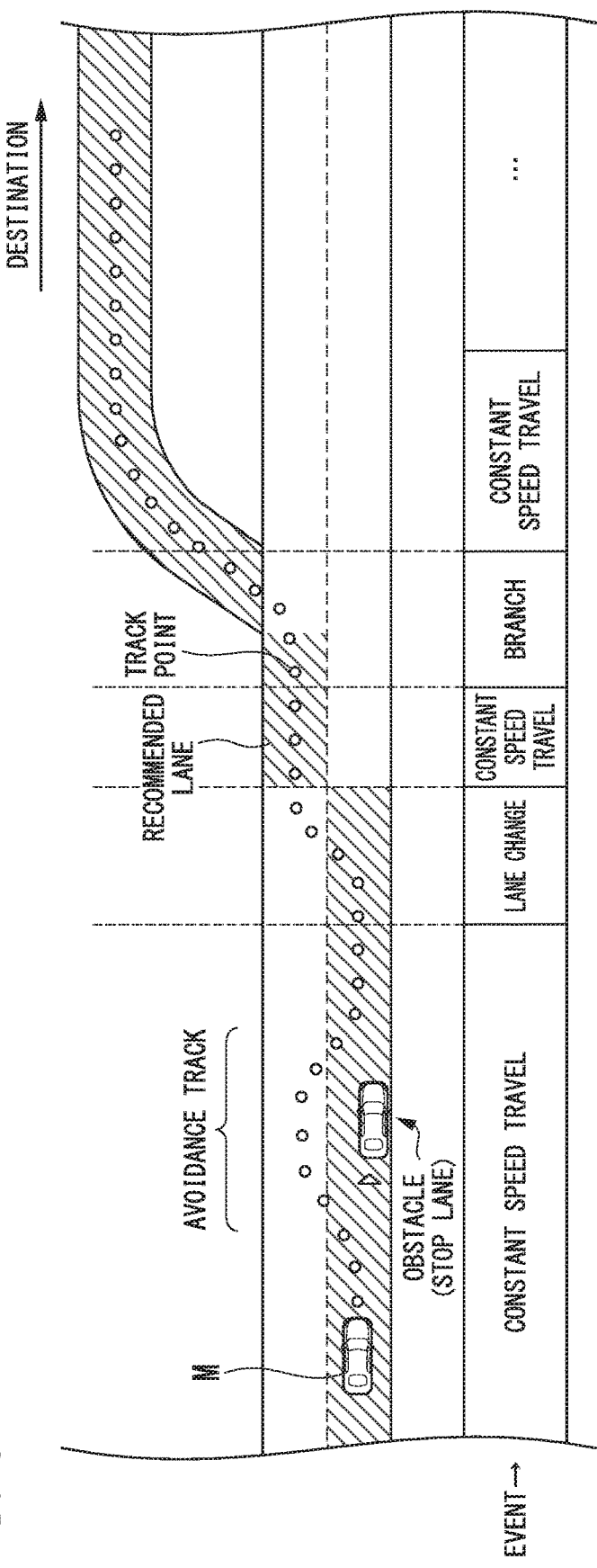
FIG. 3 is a diagram illustrating a mode in which a target track is generated on the basis of a recommended lane.

FIG. 3 is a diagram illustrating a mode in which the target track is generated on the basis of the recommended lane. As illustrated in the drawing, the recommended lane is set such that travel along a route to a destination is convenient. Upon reaching a position within a predetermined distance of a switching point of the recommended lane (may be determined according to the type of an event), the behavior plan generator 123 starts to operate the lane change event, the branch event, the merging event and the like. When it is necessary to avoid an obstacle during the execution of each event, an avoidance track is generated as illustrated in the drawing.

When the curve travel event is performed, the behavior plan generator 123 sets a target track on the basis of information included in the second map information 62 or generates a target track on the basis of recognition results obtained when the external recognizer 121 has recognized the shape of a curve on the basis of the image captured by the camera 10. The former is possible when the second map information 62 includes sufficient information on the shape of the curve through which the host vehicle M will pass next, and the latter is possible even when the second map information 62 does not include sufficient information.

The second controller 140 controls a travel driving force output device 200, a brake device 210, and a steering device 220 such that the host vehicle M passes through the target track generated by the behavior plan generator 123 according to a scheduled time.

The second controller 140, for example, includes a acquisition unit 141, a parameter determiner 142, a steering controller 143, and a speed controller 144.

The acquisition unit 141 acquires information on the target track (the track points) generated by the behavior plan generator 123. The parameter determiner 142 operates when the curve travel event is performed by the behavior plan generator 123. The parameter determiner 142 determines a parameter by which a track model defined by one or more parameters coincides with the target track. Details will be described later. The steering controller 143 controls the steering device 220 on the basis of the track model, which is determined by the parameter determiner 142 and defined by the parameters, in curve traveling. The speed controller 144 controls the travel driving force output device 200 or the brake device 210 on the basis of speed elements associated with the target track.

The travel driving force output device 200 outputs travel driving force (torque) for vehicle traveling to driving wheels. The travel driving force output device 200, for example, includes a combination of an internal combustion engine, an electric motor, a transmission and the like, and an ECU for controlling them. The ECU controls the aforementioned elements according to information input from the second controller 140 or information input from the driving operator 80.

The brake device 210, for example, includes a brake caliper, a cylinder for transferring oil pressure to the brake caliper, an electric motor for generating the oil pressure in the cylinder, and a brake ECU. The brake ECU controls the electric motor according to the information input from the second controller 140 or the information input from the driving operator 80, thereby allowing brake torque in accordance with a brake operation to be output to each wheel. The brake device 210 may have a backup mechanism for transmitting oil pressure generated by an operation of the brake pedal included in the driving operator 80 to the cylinder via a master cylinder. In addition to the aforementioned configuration, the brake device 210 may be an electronic control oil pressure brake device that controls an actuator according to the information input from the second controller 140, thereby transmitting oil pressure of the master cylinder to the cylinder.

The steering device 220, for example, includes a steering ECU and an electric motor. The electric motor, for example, changes a direction of a turning wheel by allowing force to act on a rack and pinion mechanism. The steering ECU drives the electric motor according to the information input from the second controller 140 or the information input from the driving operator 80, thereby changing the direction of the turning wheel.

[Control in Curve Traveling]

Hereinafter, processing content of the second controller 140 in curve traveling will be described. Firstly, processing of the parameter determiner 142 will be described. The parameter determiner 142 searches for a predicted travel track with the smallest separation with the target track generated by the behavior plan generator 123. The predicted travel track is a track following a track model defined by a parameter when the parameter is assumed. For example, the track model is a curve model including a part or all of a curve. The track model may be a model connecting a straight line, in addition to the curve model. As the track model, various curve models such as an arc model, an Ackerman model, and a two-wheel model can be employed. In the following description, it is assumed that the arc model which is an example of the curve model is employed. The arc model, for example, is a curve model in which a part or all of a track is an arc. In this case, the parameter is a curvature or a curvature radius. Accordingly, the parameter determiner 142 searches for an estimated curvature C of an arc model with the smallest separation with the track generated by the behavior plan generator 123. The estimated curvature C is used for feedforward control of the steering controller 143.

The Ackerman model is a model for deciding a turning angle of a steering wheel in turning of a vehicle such that rotation centers of four front and rear wheels are equal to one another. The two-wheel model is a model in which right and left wheels are collected into one and then motion equations in a lateral direction and a yaw direction of a vehicle are set forth as a motion equation of regular circle turning.

Figure 4:
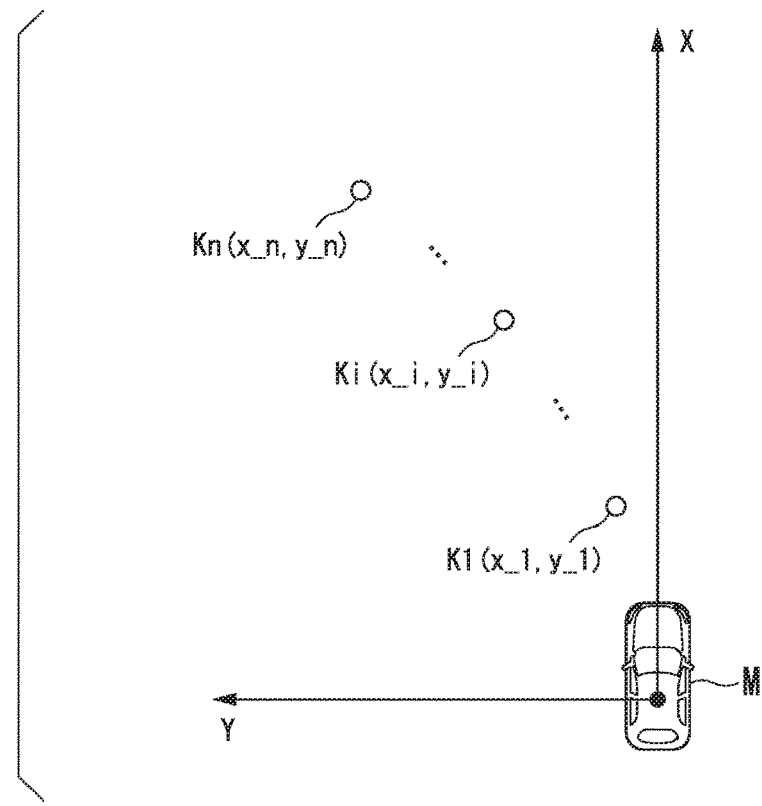
FIG. 4 is a diagram illustrating a relation between the host vehicle and track points included in a target track.
Figure 5:
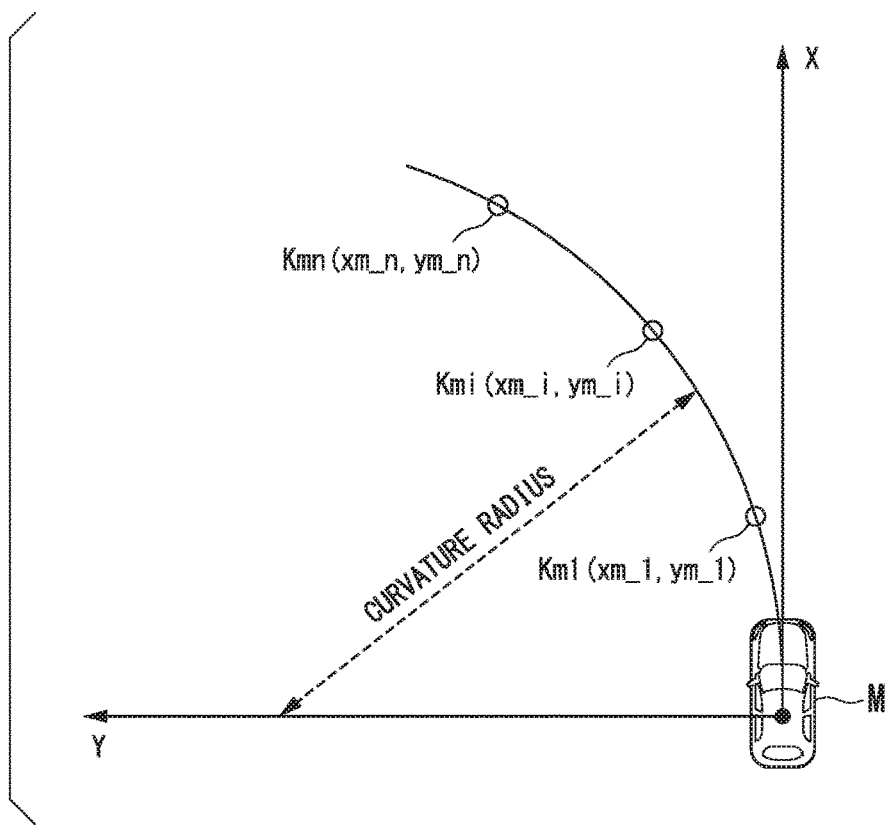
FIG. 5 is a diagram illustrating an outline of a predicted travel track.

In the following description, definitions will be described. FIG. 4 is a diagram illustrating a relation between the host vehicle M and track points K included in the target track. As illustrated in the drawing, it is assumed that a proceeding direction (a vehicle center axis direction) of the host vehicle M at a certain time point is an X axis and a direction perpendicular to the X axis is a Y axis. The second controller 140 receives a plurality of track points Ki ($x\_i$, $y\_i$) ($i=1$ to n). The track points K, for example, are set as a relative position for the host vehicle M. In contrast, FIG. 5 is a diagram illustrating an outline of a predicted travel track.

Hereinafter, a coordinate of a predicted track point Kmi included in the predicted travel track is indicated by (xm_i, ym_i).

Figure 6:
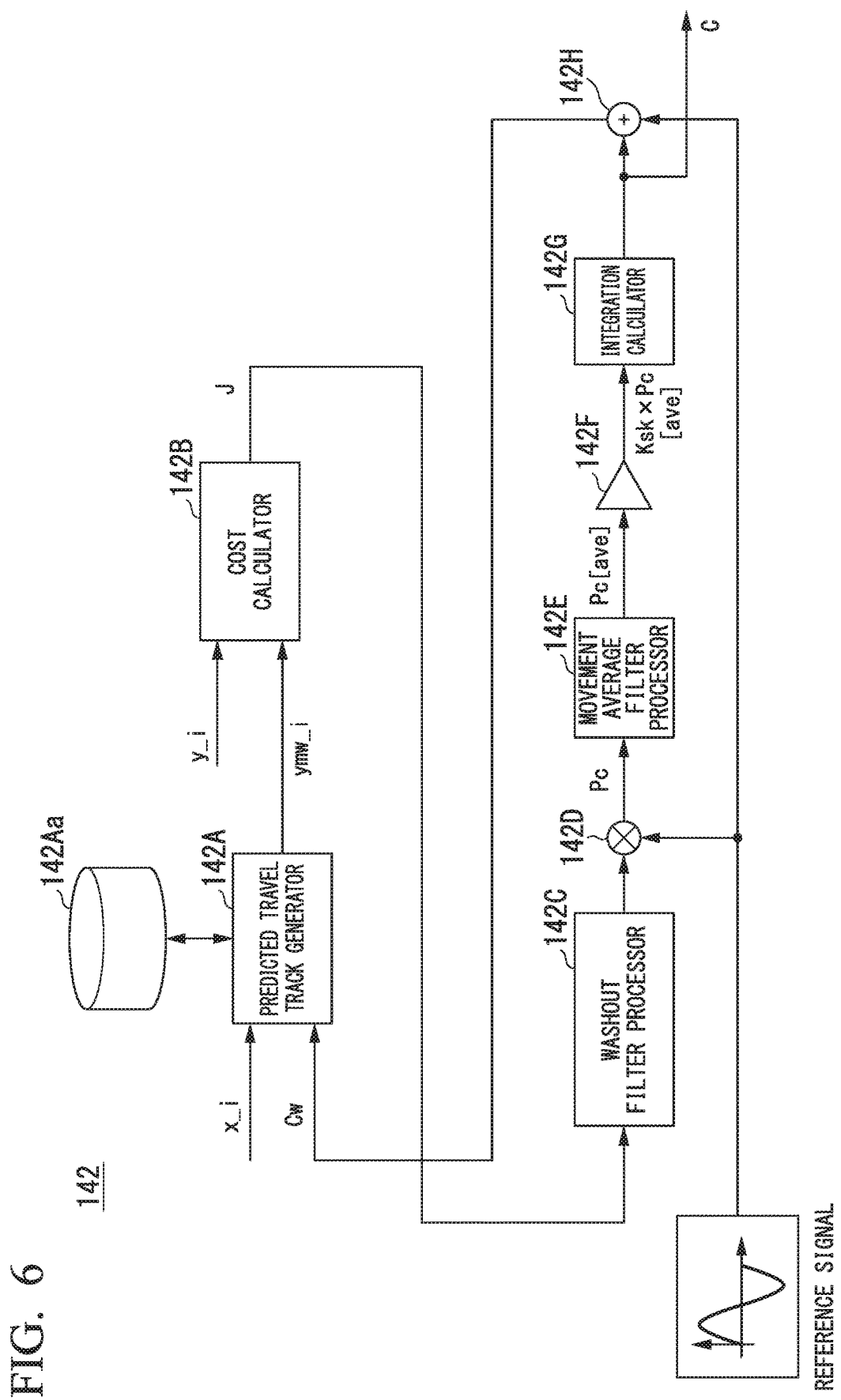
FIG. 6 is a diagram illustrating processing content of a parameter determiner in the form of a block.

FIG. 6 is a diagram illustrating the processing content of the parameter determiner 142 in the form of a block. Each functional part illustrated in FIG. 6 indicates states in one search cycle when the parameter determiner 142 periodically performs repetitive search. The parameter determiner 142 performs a search process for an entire control cycle of the second controller 140 by performing oversampling. The control cycle, for example, is a cycle at which one set of track points are input from the behavior plan generator 123 or a cycle at which the steering controller 143 or the speed controller 144 outputs a control signal. The control cycle, for example, has a period of about several hundreds of [ms] and a cycle of the search process (hereinafter, a search cycle) has a period of about tens to several tens of [ms]. In an oversampled search cycle during no-change of the control cycle, the track points Ki of the target track are not changed and the same track points Ki are used for the repetitive process. Hereinafter, an argument q indicates the sequence of a process of the search cycle.

The parameter determiner 142, for example, includes a predicted travel track generator 142A, a cost calculator 142B, a washout filter processor 142C, a multiplication part 142D, a movement average filter processor 142E, an amplification part 142F, an integration calculator 142G, and an addition part 142H.

The predicted travel track generator 142A applies the X coordinate x_i of the track point Ki to a track model defined by a parameter, thereby deriving a y coordinate ymw_i of a predicted travel track corresponding to the X coordinate x_i of the track point Ki. Herein, it is assumed that i is 1 to n and when an argument i is indicated unless specifically mentioned, an operation and the like are performed from 1 to n. The predicted travel track generator 142A receives an estimated curvature Cw including a reference signal. The estimated curvature Cw, for example, is expressed by Equation (1) below. C (q) denotes an estimated curvature at a search cycle q and w (q) denotes a value of a reference signal at a research cycle q. The reference signal w, for example, is a sine wave and may be generated by software or hardware. An amplitude of the reference signal w may be adjusted according to system design.

$$Cw(q)=C(q)+w(q) \quad (1)$$

The predicted travel track generator 142A, for example, derives the y coordinate ymw_i of the predicted travel track with reference to a track model regulating table 142Aa defining a track model. The track model regulating table 142Aa is stored in a storage device such as a read only memory (ROM), a random access memory (RAM), a hard disk drive (HDD), and a flash memory.

FIG. 7 is a diagram illustrating an example of the content of the track model regulating table 142Aa. As illustrated in the drawing, the track model regulating table 142Aa is a table in which values of the y coordinate y_i are correlated with combinations of a curvature or a curvature radius and the X coordinate x_i. The processing of the predicted travel track generator 142A using the track model regulating table 142Aa, for example, is expressed by Equation (2) below. In Equation (2) below, xm_i is x_i.

$$Km\_i(xm\_i,ym\_i)=F(x\_i,C) \quad (2)$$

Figure 8:
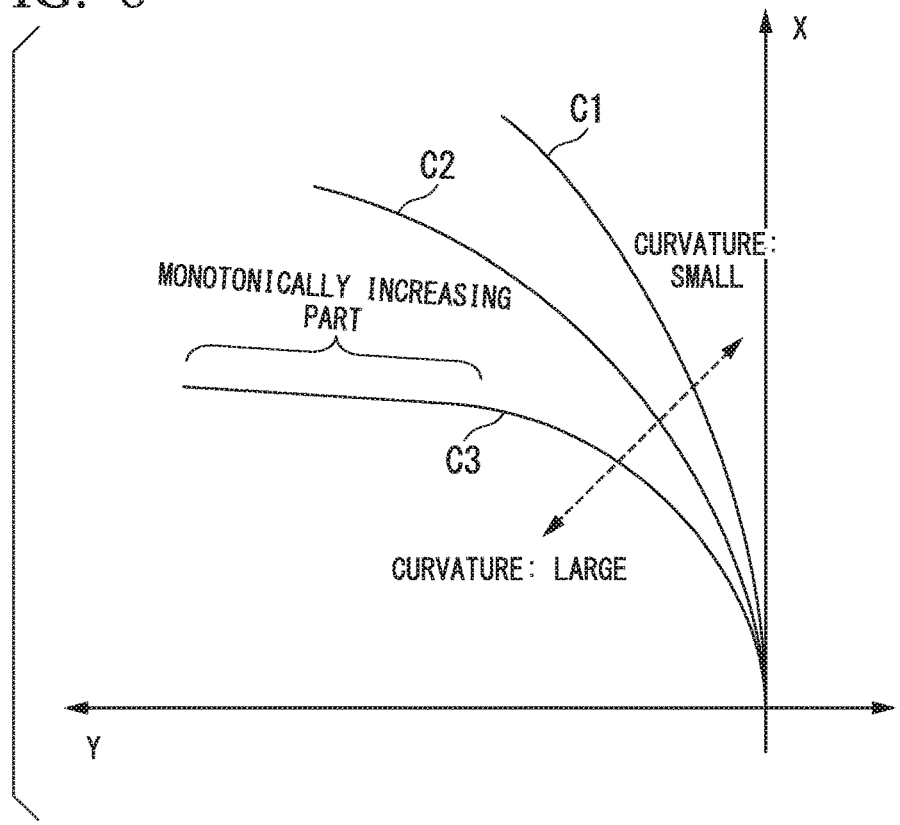
FIG. 8 is a diagram illustrating the content of the track model regulating table in the form of a graph.

When the curvature is large and the X coordinate x_i is large, the predicted travel track may be rotated by 90° or more. However, in this case, since the following process is not possible, the values of the y coordinate y_i are set to monotonically increase in a predetermined area μl of the track model regulating table 142Aa. FIG. 8 is a diagram illustrating the content of the track model regulating table 142Aa in the form of a graph. As illustrated in the drawing, in a curve C3 with a large curvature, a monotonically increasing part extends from the front side at which the sum of turning angles exceeds 90°. Therefore, the vehicle system 1 can perform stable control even in a sharp curve with a large curvature.

Returning to FIG. 6, the cost calculator 142B calculates a cost function J on the basis of the y coordinate y_i of the track point Ki and the y coordinate ymw_i of the predicted travel track. The cost function J, for example, is expressed by Equation (3) below. The cost function J is a squared error evaluation function of the target track and the predicted travel track.

$$J(q) = \sum_{j=1}^{n} \{ymw\_j(q) - y\_j(q)\}^2 \quad (3)$$

The washout filter processor 142C extracts a vibration component of the cost function J. The processing of the washout filter processor 142C, for example, is expressed by Equation (4) below. Instead of the washout filter processor 142C, a functional part corresponding to an arbitrary high pass filter or band pass filter may be provided.

$$H(q)=J(q)-J(q-1) \quad (4)$$

The multiplication part 142D outputs a correlation value Pc by multiplying the output H (q) of the washout filter processor 142C by the reference signal w. The processing of the multiplication part 142D, for example, is expressed by Equation (5) below.

$$P(q)=H(q) \times w(q-1) \quad (5)$$

Figure 9:
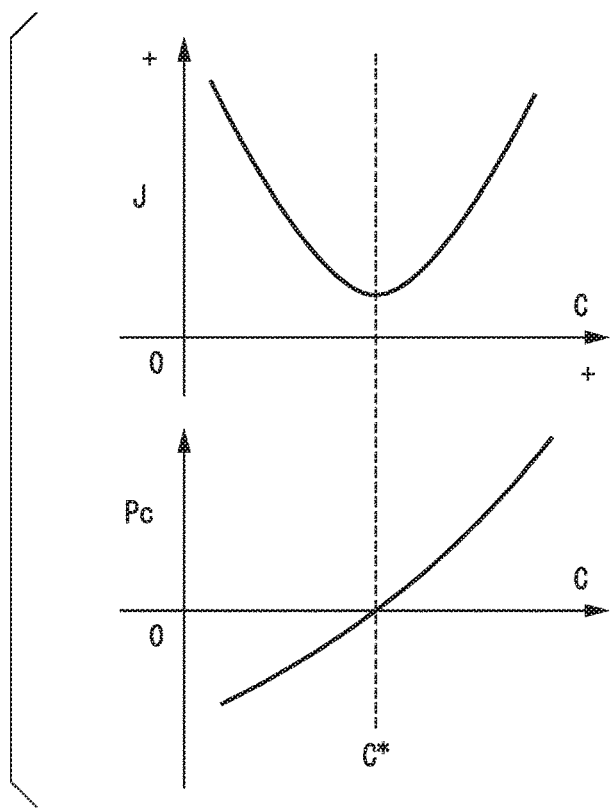
FIG. 9 is a diagram illustrating a relation between a cost function J and a correlation value Pc.

FIG. 9 is a diagram illustrating a relation between the cost function J and the correlation value Pc. The cost function J has a characteristic of having a minimum value (a bottom) when an optimal curvature C* is given. In contrast, the correlation value Pc is an evaluation value having a characteristic indicating a value around zero when the optimal curvature C* is given.

The correlation value Pc output by the multiplication part 142D includes a vibration component caused by the reference signal w. The movement average filter processor 142E removes the vibration component. The movement average filter processor 142E, for example, is a movement average filter of an integer times (M times) a period of the reference signal w. The processing of the movement average filter processor 142E, for example, is expressed by Equation (6) below.

$$Pc[ave] = \frac{1}{M} \sum_{h=q-M+1}^{q} Pc(h) \quad (6)$$

The amplification part 142F multiplies an output value of the movement average filter processor 142E by a search gain Ksk and outputs a resultant to the integration calculator 142G The search gain Ksk is a negative value. The integration calculator 142G adds an input value from the amplification part 142F to a previous value C,(q−1) of the estimated curvature C, thereby calculating a current estimated curvature C,(q). The processing of the amplification part 142F and the integration calculator 142G, for example, are expressed by Equation (7) below.

$$C(q)=C(q-1)+Ksk \times Pc[\text{ave}] \quad (7)$$

The parameter determiner 142 repeatedly performs such processes until the estimated curvature C is converged. Therefore, the estimated curvature C is adjusted such that the average value Pc [ave] of the correlation value Pc becomes zero.

As described above, the parameter determiner 142 evaluates a direction of a change in the degree of separation between the track model and the target track with respect to a change in a parameter, and determines the parameter to reduce the degree of separation on the basis of the evaluated result. The estimated curvature C is an example of the parameter and the cost function J is an example of an index value indicating the degree of separation. The degree of separation between the track model and the target track, for example, is the degree of separation between the predicted travel track and the target track based on the track model. More specifically, the parameter determiner 142 extracts a variation component from the degree of separation between a predicted travel track based on a track model defined by a parameter added with a varying reference signal and the target track, performs a filter process by multiplying the extracted variation component by the reference signal, derives a correlation value that becomes zero when the degree of separation between the track model and the target track is minimum, and searches for the parameter for making the correlation value (a value excluding the variation component) zero. The parameter determiner 142, for example, searches for a parameter for making the correlation value zero by integral feedback. Therefore, the parameter determiner 142 can quickly determine the parameter while suppressing an increase in a processing load.

Figure 10:
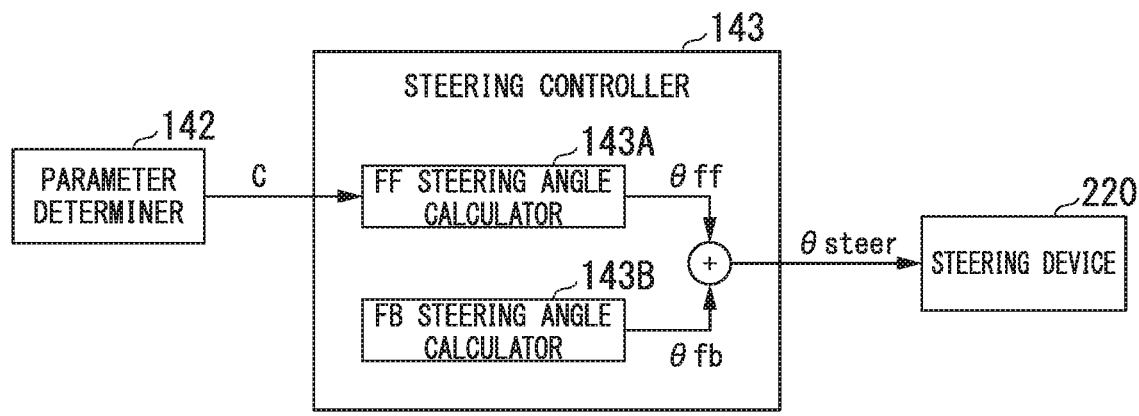
FIG. 10 is a configuration diagram focusing on a steering controller.

Hereinafter, the processing content of the steering controller 143 will be described. FIG. 10 is a configuration diagram focusing on the steering controller 143. The steering controller 143 includes a feedforward (FF) steering angle calculator 143A and a feedback (FB) steering angle calculator 143B. In scenes other than the curve traveling, the steering controller 143 may simply perform control following the target track without starting to operate these functional parts.

The FF steering angle calculator 143A determines a feedforward steering angle θff on the basis of the estimated curvature C output by the parameter determiner 142. The FF steering angle calculator 143A derives the feedforward steering angle θff, which is a component of some of steering angles, on the basis of a model that converts a curvature into a steering angle, a table, and the like. The processing content of the FF steering angle calculator 143A, for example, is expressed by Equation (8) below. In Equation (8) below, Gst_ff denotes a model, a table and the like in which a curvature is converted into a steering angle.

$$\theta f\!f = Gst\_f\!f(C) \quad (8)$$

Figure 11:
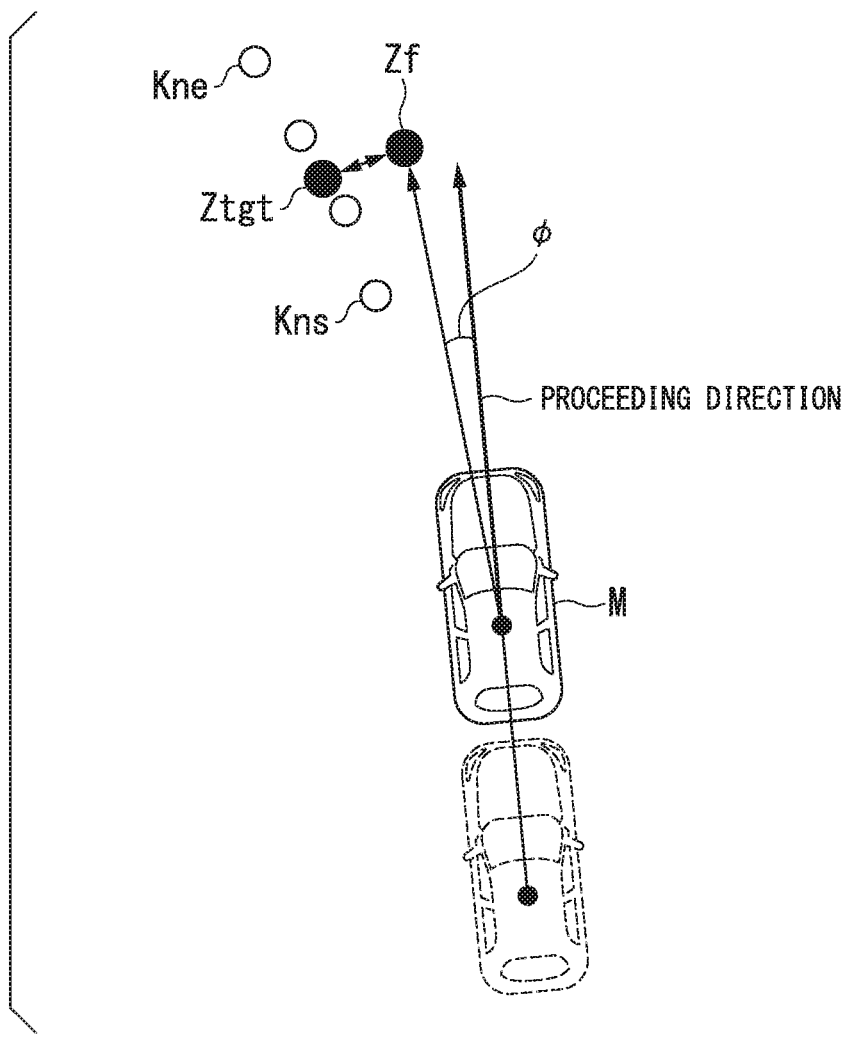
FIG. 11 is a diagram for explaining a lateral deviation.

The FB steering angle calculator 143B determines a feedback steering angle θfb such that a lateral deviation between a target position Ztgt in front of the host vehicle M and a future potion Zf considering a slip angle is small. FIG. 11 is a diagram for explaining the lateral deviation. The target position Ztgt, for example, is a position obtained by calculating an average of the positions of the plurality of track points K and is set to a position of about several [m] in front of the host vehicle M. The target position Ztgt may be a position obtained by calculating a weighted average of the positions of a plurality of track points K. The target position Ztgt may be set to a position remote from the host vehicle M as the speed V of the host vehicle M is high. The future potion Zf, for example, is a projective point from the target position Ztgt in a direction considering a slip angle φ with respect to the proceeding direction of the host vehicle M. The proceeding direction of the host vehicle M is a direction in which a past position of the host vehicle M and a current position of the host vehicle M are connected to each other. The target position Ztgt, for example, is expressed by Equation (9) below and the future potion Zf, for example, is expressed by Equation (10) below. In Equation (9) below, ns denotes an identification number of a track point nearest the host vehicle M among track points K of which an average of positions are calculated, and ne denotes an identification number of a track point remotest from the host vehicle M among the track points K of which an average of positions are calculated. The FB steering angle calculator 143B may change the ns and the ne on the basis of the speed of the host vehicle M or the estimated curvature C. For example, the FB steering angle calculator 143B may set the ns and the ne to a small value (indicating that the track point is near the host vehicle M) when the speed of the host vehicle M is small and set the ns and the ne to a large value (indicating that the track point is remote from the host vehicle M) when the speed of the host vehicle M is large. The FB steering angle calculator 143B may set the ns and the ne to a small value when the estimated curvature C is large and set the ns and the ne to a large value when the estimated curvature C is small. ΔTp denotes a predicted time and may be large as the speed V of the host vehicle M is high.

$$Ztgt(xtgt, ytgt) = \left(\frac{1}{ne-ns+1}\sum_{ns}^{ne} x\_i, \frac{1}{ne-ns+1}\sum_{ns}^{ne} y\_i\right) \quad (9)$$

$$Zf(xf, yf) = (V \times \Delta Tp \times \cos\phi, V \times \Delta Tp \times \sin\phi) \quad (10)$$

The lateral deviation Ey (q) is expressed by (ytgt−yf). The FB steering angle calculator 143B, for example, operates as a simplified sliding mode controller (SMC) with respect to the lateral deviation Ey (q). That is, the FB steering angle calculator 143B performs feedback control for the lateral deviation Ey (q) so as to maintain a state in which a changeover function σ (q) expressed by Equation (11) below becomes zero. The state in which the changeover function 6 (q) becomes zero is a state in which a temporal change in the lateral deviation Ey (q) is placed on a changeover straight line expressed by Ey (q)=−S×Ey (q−1). In Equation (11) below, S denotes a value from −1 to 0.

$$\sigma(q) = Ey(q) + S \times Ey(q-1) \quad (11)$$

The FB steering angle calculator 143B, for example, calculates a lateral position feedback amount ufb (q) on the basis of Equation (12) below. In Equation (12) below, ufb_rch (q) denotes reach rule input and is expressed by Equation (13) below and ufb_adp (q) denotes adaptive rule input and is expressed by Equation (14) below. Krch and Kadp are respectively feedback coefficients having a negative value. As described above, the FB steering angle calculator 143B performs control for allowing separation from the changeover straight line to be small.

$$ufb(q) = \text{ufb\_rch}(q) + \text{ufb\_adp}(q) \tag{12}$$

$$\text{ufb\_rch}(q) = Krch \times \sigma(q) \tag{13}$$

$$\text{ufb\_adp}(q) = \sum_{j=1}^{q} Kadp \times \sigma(j) \tag{14}$$

Then, the FB steering angle calculator 143B derives the feedback steering angle θfb by applying the lateral position feedback amount ufb (q) to Equation (15) below. In Equation (15) below, Kst denotes a sensitivity gain calculated on the basis of a two-wheel model and an Ackerman model.

$$\theta fb(q) = Kst \times ufb(q) \tag{15}$$

The steering controller 143 adds the feedback steering angle θfb determined by the FB steering angle calculator 143B to the feedforward steering angle θff determined by the FF steering angle calculator 143A, thereby deciding a steering angle θsteer to be applied to the steering device 220.

Figure 12:
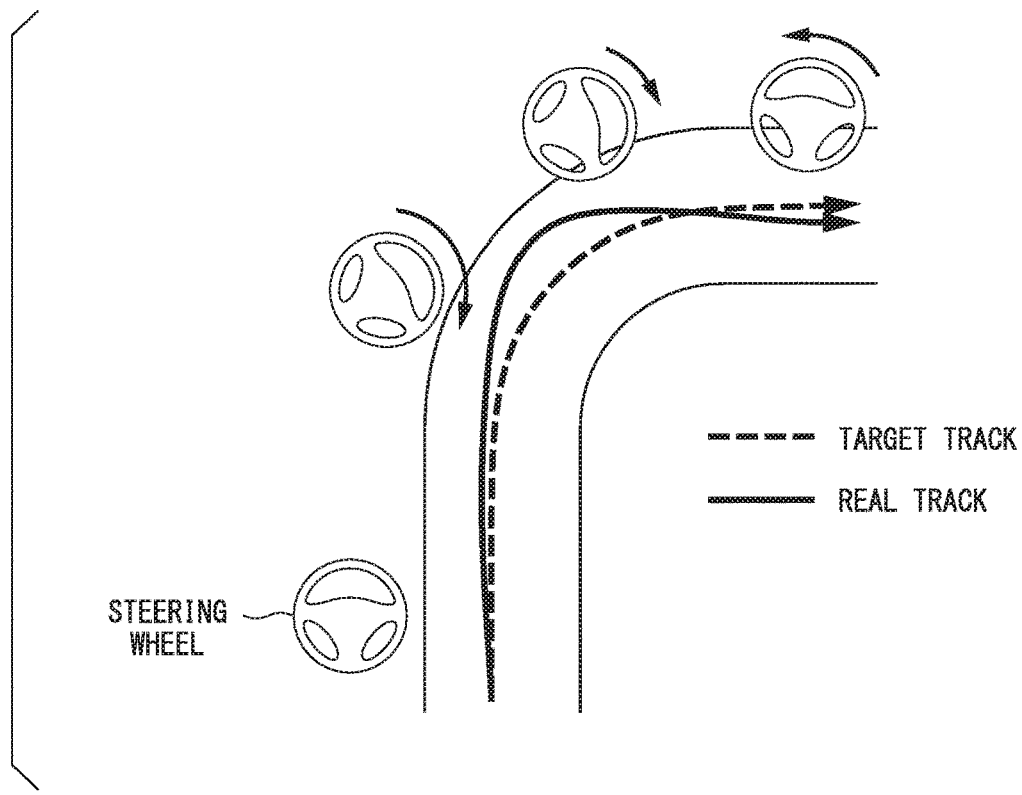
FIG. 12 is a diagram illustrating a result of curve traveling according to a comparative example.
Figure 13:
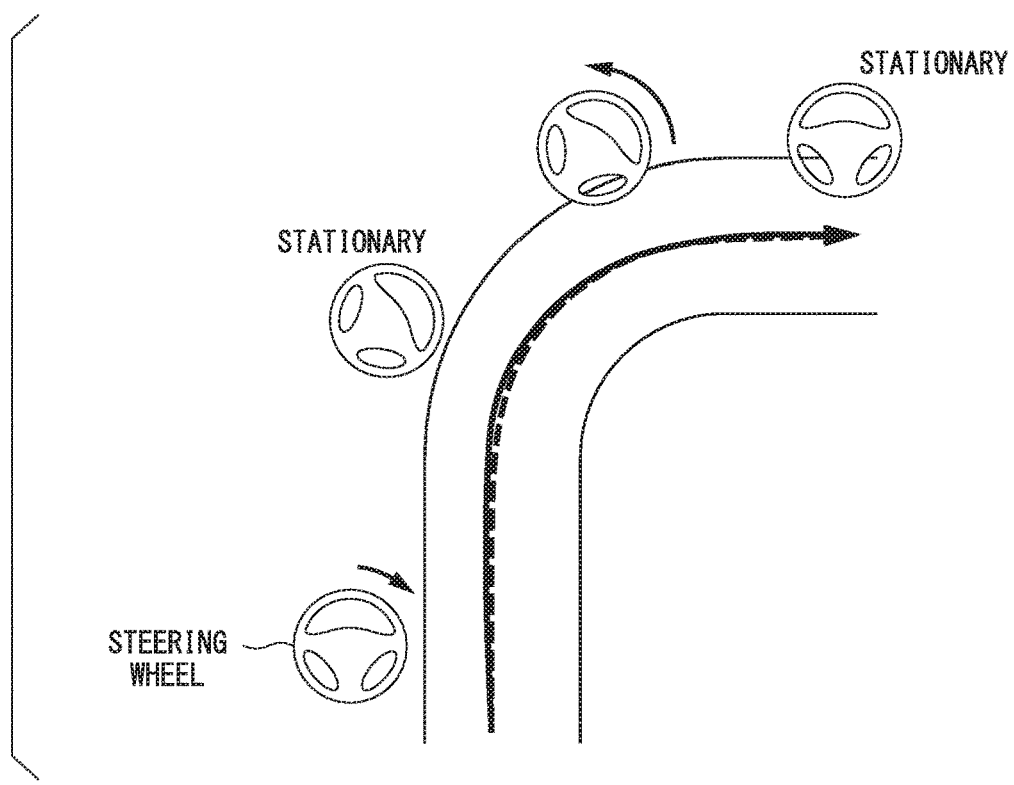
FIG. 13 is a diagram illustrating a result of curve traveling according to a method of an embodiment.

Hereinafter, a description will be provided for comparison with when simply traveling along a curve along the target track. FIG. 12 is a diagram illustrating a result of curve traveling according to a comparative example. In this example, for example, steering control is performed to travel toward a track point separated by a predetermined distance. In this case, when it is assumed that a control cycle is a period of about several hundreds of [ms], since a turning angle is not sufficient due to a dead time corresponding to the control cycle and response lag occurring by inertial moment of a vehicle body, it is necessary to perform control corresponding to expansion of a track in the middle of a curve, that is, steering of a steering wheel. In order to avoid this, when shortening the control cycle and increasing a feedback gain, there is a case where a steering angle is finely adjusted and it is inconvenient for a driver. FIG. 12 and FIG. 13 illustrate examples when a steering wheel is rotated together with turning of a vehicle in automated driving, and it is assumed that in a case of a vehicle having no mechanical connection by a steer-by-wire, a steering wheel is held at a neutral position even when the vehicle turns.

In contrast, FIG. 13 is a diagram illustrating a result of curve traveling according to a method of an embodiment. As illustrated in the drawing, in the method of the embodiment, a track model coinciding with the target track is obtained in advance and a steering angle is determined on the basis of feedforward control, so that it is possible to start turning more quickly and sufficiently follow a curve shape. The steering angle is less likely to be changed more than necessary and a change in an unnecessary later acceleration can be reduced, so that it is possible to perform comfort traveling by a driver.

When a steering angle is given in a vehicle, since the vehicle travels along an arc-shaped track in consideration of an understeer, it can be said that obtaining a feedforward steering angle by using an arc model in curve traveling is reasonable approach. However, since it is not possible to perform polynomial approximation based on a least squares method with respect to an arc, it is difficult to fit the arc to a target track in the related art. In contrast, in the method of the embodiment, processing is performed to move a vehicle according to a slope by adding a sine wave to an estimated curvature, so that it is possible to reduce a square error and to quickly fit an arc model to a target track.

The travel control apparatus of the aforementioned embodiment includes an acquisition unit (141), which acquires information on a target track through which a vehicle (M) will pass in the future, the parameter determiner (142), which determines a parameter by which a track model defined by one or more parameters coincides with a track acquired by the acquisition unit, and the steering controller (143), which feedforward-controls steering of the vehicle on the basis of at least the track model defined by the parameter determined by the parameter determiner, wherein the parameter determiner evaluates a direction of a change in the degree of separation between the track model and the target track with respect to a change in the parameter and determines the parameter on the basis of the evaluated result, so that it is possible to allow the vehicle to smoothly travel along a curve.

While preferred embodiments of the invention have been described and illustrated above, it should be understood that these are exemplary of the invention and are not to be considered as limiting. Additions, omissions, substitutions, and other modifications can be made without departing from the spirit or scope of the present invention.

For example, in the aforementioned embodiment, although automated driving along a route to a destination has been described, the present invention is not limited thereto and automated driving along a road may be performed. In the automated driving along a road, a travel lane is maintained and is traveled without lane change, but in a curve, steering control is automatically performed. The output of driving force depends on a driver's operation and only steering control may be automatically performed.

What is claimed is:

1. A travel control apparatus comprising:
a processor configured to:
acquire information on a target track through which a vehicle is to pass in the future;
determine a parameter by which a track model defined by one or more parameters coincides with the target track; and
facilitate feedforward-control steering of the vehicle based on at least the track model defined by the one or more parameters,
wherein the one or more parameters are determined based on a direction of a change in a degree of separation between the track model and the target track with respect to a change in the one or more parameters, and
wherein the track model is formed such that a displacement in a proceeding direction is monotonically increased from a front at which a sum of turning angles exceeds 90°.

2. The travel control apparatus according to claim 1, wherein the track model is a curve model obtained by modeling the target track including a curve.

3. The travel control apparatus according to claim 1, wherein the track model is a model including an arc and the one or more parameters are a curvature or a curvature radius of the arc.

4. The travel control apparatus according to claim 1, wherein the processor: facilitates an addition of a reference signal to an input value of a function for evaluating the degree of separation between the track model and the target track, extracts a variation component of an output value of the function, performs a filter process by multiplying the extracted variation component by the reference signal, derives a correlation value that becomes zero when the degree of separation between the track model and the target track is minimum, and searches for the parameter for making the correlation value zero.

5. The travel control apparatus according to claim 4, wherein the processor performs an integration feedback process, thereby searching for the one or more parameters for making the correlation value zero.

6. The travel control apparatus according to claim 4, wherein the filter process includes a movement average filter process of an integer times a period of the reference signal.

7. The travel control apparatus according to claim 1, wherein the processor calculates a feedback steering angle for reducing a lateral deviation for a target position by a method based on sliding mode control, and facilitates steering of the vehicle based on both a feedforward steering angle determined based on the track model and the feedback steering angle.

8. A travel control method using a computer mounted in a host vehicle, comprising:
- acquiring information on a target track through which a vehicle is to pass in the future;
- deciding a parameter by which a track model defined by one or more parameters coincides with the target track; and
- facilitating feedforward-controlling steering of the vehicle based on at least the track model defined by the one or more parameters,
- wherein, in deciding the one or more parameters, the one or more parameters are determined based on a direction of a change in a degree of separation between the track model and the target track with respect to a change in the one or more parameters, and
- wherein the track model is formed such that a displacement in a proceeding direction is monotonically increased from a front at which a sum of turning angles exceeds 90°.

9. A non-transitory computer-readable storage medium stored with a program causing a computer to perform:
- acquiring information on a target track through which a vehicle is to pass in the future;
- deciding a parameter by which a track model defined by one or more parameters coincides with the target track; and
- facilitating feedforward-controlling steering of the vehicle based on at least the track model defined by the one or more parameters,
- wherein, in deciding the one or more parameters, the one or more parameters are determined based on a direction of a change in a degree of separation between the track model and the target track with respect to a change in the one or more parameters, and
- wherein the track model is formed such that a displacement in a proceeding direction is monotonically increased from a front at which a sum of turning angles exceeds 90°.

10. A travel control apparatus comprising:
a processor configured to:
acquire information on a target track through which a vehicle is to pass in the future;
determine a parameter by which a track model defined by one or more parameters coincides with a track acquired by the processor;
feedforward-control steering of the vehicle based on at least the track model defined by the parameter,
add a reference signal to an input value of a function for evaluating a degree of separation between the track model and the target track,
extract a variation component of an output value of the function,
performs a filter process by multiplying the variation component by the reference signal,
derive a correlation value that becomes zero when the degree of separation between the track model and the target track is minimum, and
search for the parameter for making the correlation value zero.

\* \* \* \* \*